(12) United States Patent
Zesch et al.

(10) Patent No.: US 8,369,990 B2
(45) Date of Patent: Feb. 5, 2013

(54) ROBOT PLATFORM FOR REMOTELY CONTROLLED AND/OR AUTONOMOUS INSPECTION OF TECHNICAL FACILITIES

(75) Inventors: Wolfgang Zesch, Windisch (CH); Markus Wiesendanger, Zürich (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/228,358

(22) Filed: Sep. 8, 2011

(65) Prior Publication Data
US 2012/0072053 A1    Mar. 22, 2012

(30) Foreign Application Priority Data

Sep. 20, 2010   (CH) ....................................... 1520/10

(51) Int. Cl.
*G06F 19/00* (2006.01)
(52) U.S. Cl. ........... 700/245; 700/250; 701/2; 701/29.1; 318/568.11; 318/568.12; 318/568.16; 73/1.22; 73/618; 73/623; 73/864.67; 702/182
(58) Field of Classification Search .......... 700/245, 700/250; 701/2, 29.1, 568.11, 568.12, 568.16; 73/1.22, 618, 623, 864.67; 702/182
See application file for complete search history.

(56) References Cited

U.S. PATENT DOCUMENTS

| | | | |
|---|---|---|---|
| 4,616,326 A | 10/1986 | Meier et al. | |
| 4,629,319 A * | 12/1986 | Clarke et al. | 356/237.2 |
| 4,851,748 A | 7/1989 | Daggett et al. | |
| 4,868,472 A | 9/1989 | Daggett et al. | |
| 4,908,556 A | 3/1990 | Daggett et al. | |
| 4,962,338 A | 10/1990 | Daggett et al. | |
| 5,685,383 A | 11/1997 | Ferrante | |
| 6,104,970 A | 8/2000 | Schmidt, Jr. et al. | |
| 6,594,591 B2 * | 7/2003 | Clark et al. | 702/35 |
| 6,763,282 B2 * | 7/2004 | Glenn et al. | 700/245 |
| 6,882,412 B2 * | 4/2005 | Silverman et al. | 356/237.1 |
| 7,017,432 B2 * | 3/2006 | Silverman et al. | 73/865.8 |
| 7,296,488 B2 * | 11/2007 | Hock et al. | 73/866.5 |
| 7,467,560 B2 * | 12/2008 | Silverman et al. | 73/865.8 |
| 2008/0148876 A1 | 6/2008 | Hock et al. | |

FOREIGN PATENT DOCUMENTS

| | | |
|---|---|---|
| DE | 3244307 A1 | 5/1984 |
| EP | 0526901 A1 | 2/1993 |
| JP | 7246931 A | 9/1995 |
| WO | 2006096122 A1 | 9/2006 |

OTHER PUBLICATIONS

ZR-1 Robot System for Inspection & Maintenance/Repair Data Sheet, 2 pages Zetec Robots; www.zetec.com.
Magman MKIII Circumferential and Longitudinal Weld Scanner Data Sheet, 2 pages Phoenix Inspection Systems Ltd. Dalton House, 40 Hardwick Grange Warrington WA1 4RF, United Kingdom; www.phoenixisl.co.uk.

* cited by examiner

*Primary Examiner* — James P. Trammell
*Assistant Examiner* — McDieunel Marc
(74) *Attorney, Agent, or Firm* — Volpe and Koenig, P.C.

(57) ABSTRACT

A robot platform is provided, which is intended in particular for remotely controlled and/or autonomous inspection of technical facilities, in particular in power stations, and comprises at least a drive mechanism configured to move the robot platform, an inspection device configured to inspect the technical facility and a communication device for exchanging measurement and/or control data. Particular flexibility in use and extended areas of use are achieved in that the robot platform is modular and the communication device operates in accordance with a uniform standard.

15 Claims, 4 Drawing Sheets

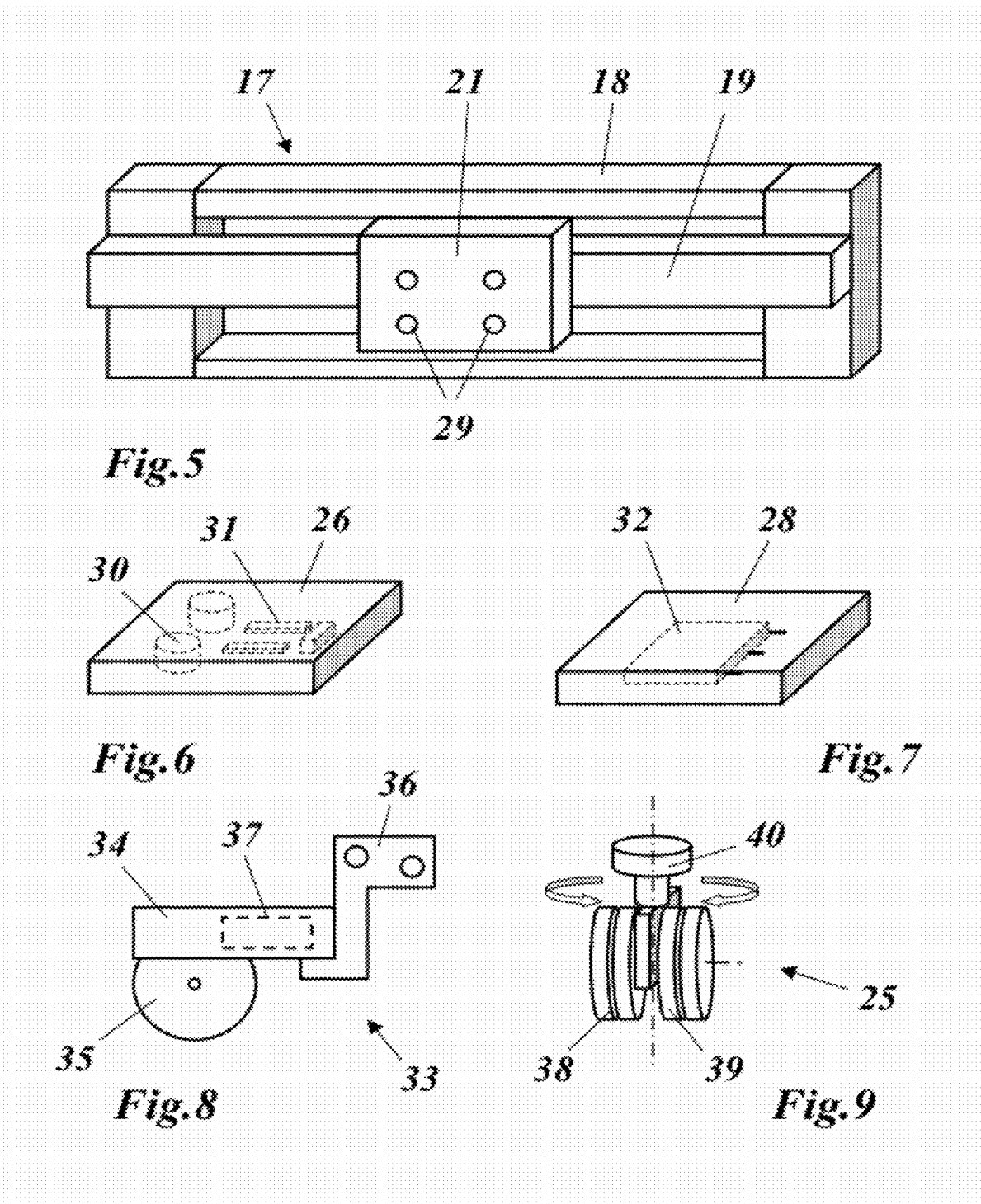

ROBOT PLATFORM FOR REMOTELY CONTROLLED AND/OR AUTONOMOUS INSPECTION OF TECHNICAL FACILITIES

RELATED APPLICATIONS

The present application hereby claims priority under 35 U.S.C. Section 119 to Swiss Patent application number 01520/10 filed Sep. 20, 2010, the entire contents of which are hereby incorporated by reference.

FIELD OF INVENTION

The present invention relates to the field of automated inspection of large technical facilities such as gas or steam turbines, boilers or tanks. It relates in particular to a robot platform.

BACKGROUND

Various inspection and servicing tasks in large technical facilities, such as power stations, require different types of robots if these tasks are intended to be carried out in areas where external access is difficult, the robots must be designed and constructed specifically for the respective purpose, and in very limited numbers. It is therefore highly time-consuming and costly to develop and to construct robots such as these from the start for a specific purpose. When robots such as these are controlled externally, thick and heavy supply cables are required for this purpose, which link the robot to an appropriate external station, in order to transmit control signals and electrical power to the robot, and to transmit position messages from the robot to the external station, for example U.S. Pat. No. 6,104,970 or US 2008148876 A1, which are incorporated by reference.

Although inspection systems are commercially available which allow various sensors for various purposes to be fitted to a platform (for example the "Magman" scanner from Phoenix Inspection Systems Ltd., or the ZR-1 robot system from Zetec, Inc.), a range of use even of such systems which can be used flexibly is, however, restricted. Furthermore, even in the case of these systems, a multiplicity of different cable links are required in order to transmit data, control signals and power between the actual inspection unit and an external control and evaluation unit. In particular, these include separate transmission of various sensor data items from the position determination process from the unit and sensors which are susceptible to defects, and considerably restrict the freedom of movement of the unit, because of the associated cables.

SUMMARY

The present disclosure is directed to a robot platform, for remotely controlled and/or autonomous inspection of technical facilities. The robot platform includes at least a drive mechanism configured to move the robot platform; an inspection device configured to inspect the technical facility; a position determination device configured to determine position data of the robot platform, and a communication device configured to exchange measurement and/or control data and transmission of measurement and position data to an evaluation unit. The robot platform is modular. The communication device operates in accordance with a uniform standard, and the measurement and position data is streamed to the evaluation unit with a time delay of less than 1 ms.

BRIEF DESCRIPTION OF THE DRAWINGS

The invention will be explained in more detail in the following text, using exemplary embodiments and in conjunction with the drawing, in which:

FIG. 5 shows the linear movement module from FIG. 2 on its own;

FIG. 6 shows the power submodule from FIG. 4 on its own;

FIG. 7 shows the microcontroller submodule from FIG. 4 on its own;

FIG. 8 shows a side view of a position transmitter submodule for determination of the position of the robot platform; and FIG. 9 shows a perspective illustration of a steering roller, which can rotate about a vertical rotation axis, for assisting the mobility of the robot platform.

DETAILED DESCRIPTION OF THE PREFERRED EMBODIMENTS

Introduction to the Embodiments

Figure 1:
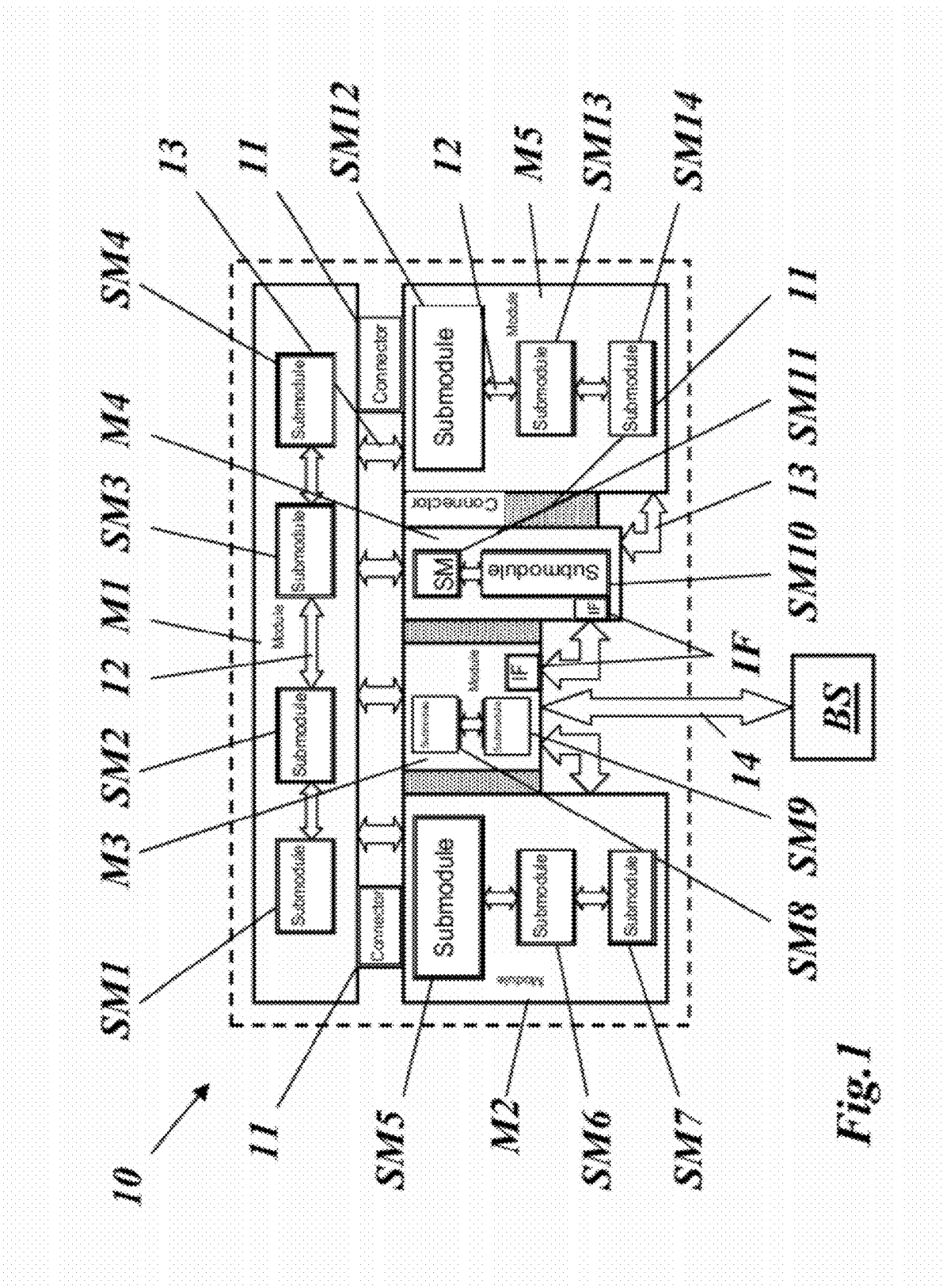
FIG. 1 shows a block diagram of the design of a modular robot platform according to one exemplary embodiment of the invention.

An object of the invention is to provide a robot platform for an inspection system, which avoids the disadvantages of known inspection units and provides a substantial broadening of the capability for matching to different inspection tasks and scenarios, as well as greatly simplified and interference-resistant data communication. The object is achieved by the appended claims.

The robot platform according to the invention, which is intended in particular for remotely controlled and/or autonomous inspection of technical facilities, in particular in power stations, and comprises at least a drive mechanism that moves the robot platform; an inspection device that inspects the technical facility; a device to determine position data of the robot platform, and a communication device to exchange measurement and/or control data and transmission of measurement and position data to an evaluation unit. The robot platform is modular, in that the communication device operates in accordance with a uniform standard, and the measurement and position data is streamed to an evaluation unit sufficiently quickly that the time delay is sufficiently short for error-free evaluation, and in particular is less than 1 ms.

In one refinement of the robot platform according to the invention, the robot platform is formed from individual modules which are physically connected to one another by mechanical connectors and/or for exchanging data by digital communication links, which operate in accordance with a uniform standard.

According to another refinement, the digital communication links operate in accordance with the Ethernet standard. In this case, the rapid, low-latency transmission of the position signals and position data is important in order to avoid corruption of the measurement, that is to say, inspection signals being associated with the respective position signals.

In a further refinement of the robot platform according to the invention, the digital communication links additionally have power supplies that supply power to the modules.

According to another refinement, individual modules each have one or more submodules. In particular, one of the submodules is an interface for data exchange and the power supply link between the modules.

In a still further refinement, individual modules have an electric drive motor and an integrated control unit for the electric drive motor, which control unit has a power submodule and a microcontroller submodule as submodules. According to another refinement, at least one of the modules is a drive module for movement of the robot platform.

In one development of this refinement, the at least one drive module has an electric drive motor, in particular a direct-current motor, and, as submodules, has at least one magnet wheel for rolling on and sticking to a surface, which can be magnetized, of the technical facility to be inspected, a power submodule for supplying power to the drive motor, and a microcontroller submodule for controlling the electric drive motor.

In another refinement of the invention, one of the modules is in the form of a linear movement module for linear movement of an inspection device arranged on it.

In yet another refinement of the invention, one of the modules is a base station, which is provided in order to control the data interchange of inspection signals with the other modules and evaluation units.

In another refinement, the base station emulates encoder signals, in order to allow simple connection of evaluation units to the robot platform.

In another refinement, a device that coordinates transformation of the position data is provided upstream of the evaluation unit, such that the evaluation unit can operate in a freely selectable coordinate system which is matched to the inspection task.

In a further refinement of the invention, at least one of the modules is designed to determine the position of the robot platform. In one development of this refinement, a position transmitter submodule is provided to determine the position, and has a position transmitter wheel and an encoder unit.

DETAILED DESCRIPTION

The present invention proposes a robot platform which is designed as a modular system and can therefore be adapted to widely differing purposes depending on the choice and configuration of the individual modules. This modular system is distinguished by the following characteristics and advantages:

- the system comprises a limited number of basic modules, and application-specific parts are added to it, for example sensors
- where necessary, a control unit is integrated in the basic modules and provides the local intelligence required for operation of the module
- each module has a standardized interface for connection to other modules and/or to a base unit which is located outside the inspection location and is required for operation
- where necessary, each module has a connection for the power supply
- data is preferably interchanged between the modules in accordance with the Ethernet standard
- the robot platform has a position determination device, with the position data being transmitted and evaluated in real time via the Ethernet
- the sensors required for inspection are likewise in the form of modules, in order to allow more autonomy, robustness and flexibility
- the modularity exists as a plurality of hierarchically arranged system levels, that is to say there may be a plurality of submodules within one module, whose specific configuration determines the character of the module.

FIG. 1 shows a block diagram of the design of a modular robot platform according to one exemplary embodiment of the invention. The robot platform 10 (indicated by dashed lines) in FIG. 1 has a plurality of basic modules M1-M5, which are connected to one another to form the robot platform 10 by physical connectors 11 (for example screw connections) which are not specified in any more detail but are indicated in a shadow form in FIG. 1. Each of the modules M1-M5 itself has a plurality of submodules SM1-SM14, which are characteristic of the design and function of the respective module.

Modules M1-M5 can exchange data directly with one another via standardized communication links 13, which preferably operate in accordance with the Ethernet standard. Appropriate interfaces IF are provided in the modules M1-M5 in order to allow this data interchange. If necessary, the submodules SM1-SM14 in the individual modules M1-M5 can also exchange data via corresponding communication links 12. Furthermore, a communication link 14 is provided between the robot platform 10 and a base station BS, via which commands can be sent to the robot platform 10, and position data can be received from the robot platform 10.

Because of the modular design of the robot platform 10 and the internal communication capabilities by Ethernet between the modules and the submodules, there is sufficient intelligence in the robot platform 10 itself to allow open-loop control, closed-loop control and measurement processes to be carried out autonomously internally without having to handle a data interchange, which is sensitive to interference, with the base station BS.

Figure 2:
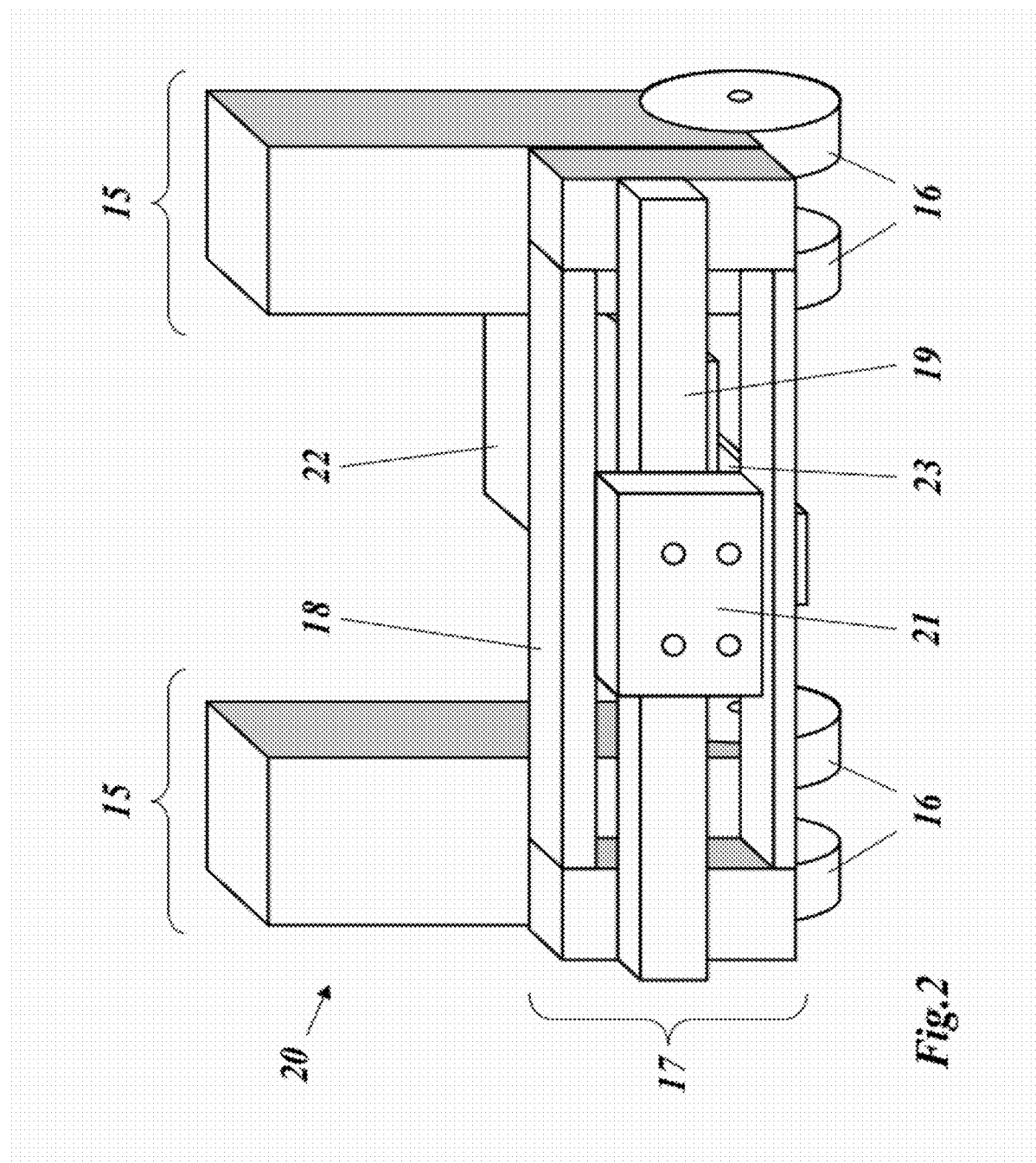
FIG. 2 shows a perspective view of a robot platform having two drive modules and a linear movement module, according to another exemplary embodiment of the invention.
Figure 4:
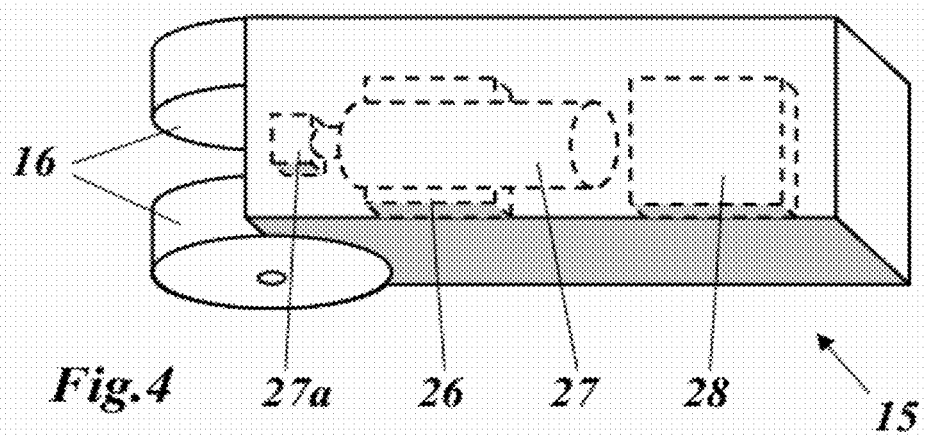
FIG. 4 shows the design of a drive module from the robot platform as shown in FIG. 2, with a direct-current motor located in it, a microcontroller submodule and a power submodule for supplying the direct-current motor.

FIG. 2 illustrates one example of a specific robot platform designed on the basis of these principles. The robot platform 20 shown there comprises two drive modules 15 of the same type, which are arranged at a distance from one another and are responsible for controlled movement of the robot platform 20. FIG. 4 shows a single drive module 15 such as this.

The drive module 15 is an elongated module with a largely cuboid geometry and, at one end, has a pair of magnetic wheels 16 which are arranged off-center such that the drive module 15 can be used for propulsion in a robot platform both in the vertical position and in the horizontal position. The magnetic wheels 16 on the one hand roll on a base when the robot platform is moved on the base. On the other hand, the magnetic wheels 16 within the drive module 15 ensure that the robot platform adheres to the base, if the base is ferromagnetic. By way of example, this allows a robot platform to be moved around a rotor shaft of a turbine without falling down or sliding off.

A direct-current motor 27 is arranged in the interior of the drive module 15 and drives the magnetic wheels 16 via a gearbox 27a. A power submodule 26 is provided to supply electricity to the direct-current motor 27 (see also FIG. 6) and, for example, may be in the form of a printed circuit board (PCB), and contains the electronic components (power semiconductors, capacitors, resistors, etc.) which are required to drive the motor. In addition to the power submodule 26, a microcontroller submodule 28 with a microcontroller 32 is also accommodated in the drive module 15. The microcontroller submodule 28 controls the operation of the direct-current motor 27 on the basis of the measured actual position and the desired nominal position of the robot platform 20. In the simplest case, an appropriate encoder can be fitted to the magnetic wheels 16 themselves, the encoder measures the revolution of the wheels and emits appropriate data to the microcontroller 32. In addition, the microcontroller submodule 28 may provide further data inputs and outputs, for example in order to allow switches or sensor data to be read in or display elements to be controlled. Such additional functionalities can easily be achieved by a control program which runs on the microcontroller 32.

If the aim is to avoid faults associated with slip when determining position, the robot platform 20 may be equipped, as shown in FIG. 8, with an autonomous position transmitter submodule 33, which uses a specific position transmitter wheel 35 to record the distance traveled, largely without slip, and makes this available as position data via an encoder unit 37 which is accommodated in the chassis 34. The position submodule 33 can be fitted to a suitable point on the robot platform by a universal mounting element 36. The microcontroller 32 is designed such that it can read and process or pass on these additional signals without major complexity. In addition to drastically reducing positioning error, this position submodule therefore also makes it possible to implement slip monitoring and to provide an appropriate warning to the superordinate program or the operator.

Figure 3:
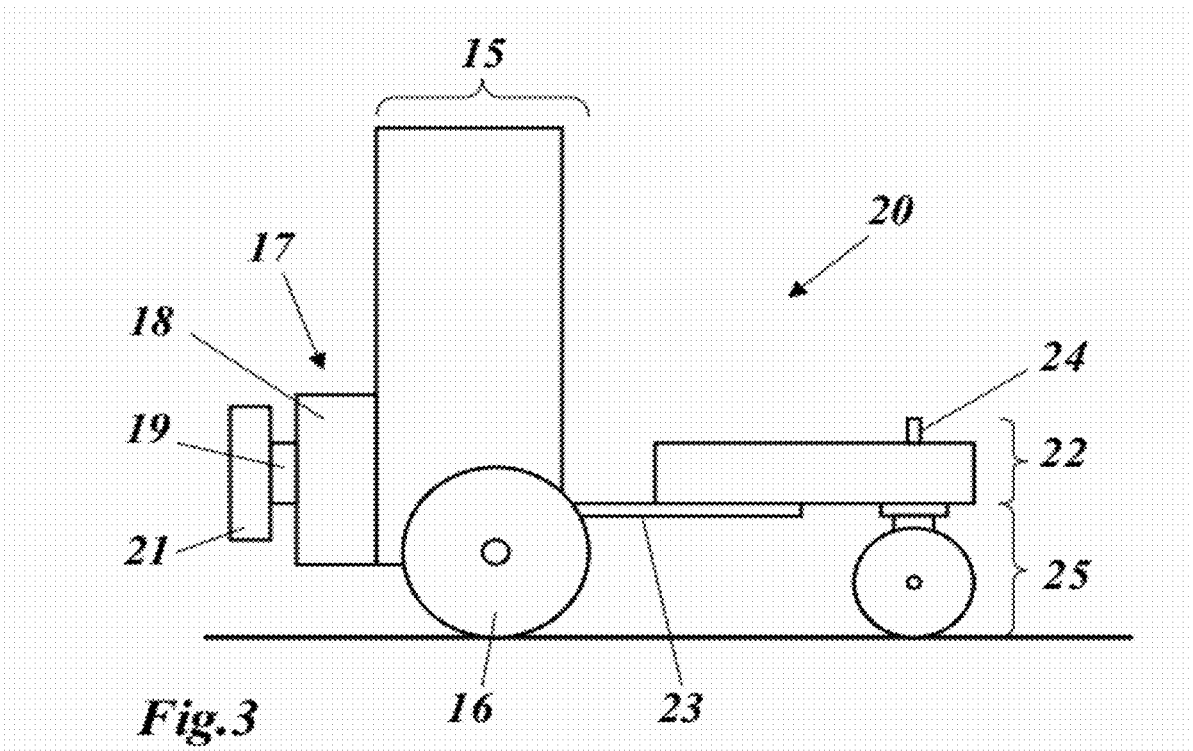
FIG. 3 shows a side view of the robot platform shown in FIG. 2.

The two drive modules 15, which are at a distance from one another, are firmly connected to one another by a linear movement module 17 in the robot platform 20 as shown in FIG. 2 and FIG. 3. The linear movement module 17, which is illustrated separately in FIG. 5, has an elongated frame which, on the front face, has a linear guide 19, which runs in the longitudinal direction. A carriage 21 is arranged such that it can move longitudinally on this linear guide 19. The carriage 21 is designed for sensor units to be fitted to it, and is therefore equipped with appropriate mounting holes (29 in FIG. 5). The carriage 21 can be moved via a motor, which is accommodated in the linear movement module 17 but is not illustrated in FIG. 2, in such a way that the sensor which is mounted on it allows movement transversely with respect to the direction of travel. In this case as well, appropriate submodules 26 and 28 for operation of the motor are accommodated in the module.

As can be seen from FIG. 3, the robot platform 20 contains an electronics box 22, as a further module, in which electronic circuits are accommodated that are required for overall operation of the robot platform. The electronics box 22 may—like the other modules as well—have connecting sockets 24, to which appropriate cables for data transmission can be connected.

In the present case, a (passive) steering roller 25 is mounted as a further module on the underneath of the electronics box 22 and supports the robot platform 20, such that it can move, in the area of the projecting electronics box 22. As illustrated in FIG. 9, the steering roller 25 has two wheels 38 and 39 which are arranged parallel and are mounted via a rotating bearing 40 such that they can rotate about a vertical axis. A roller such as this can advantageously be used for steering the robot platform 20, when combined with an appropriate servo module. Another steering option is provided by differentially driving to the two drive modules 15.

The communication links 12-14 may be cable-based. However, it is also feasible for certain communication links to be wireless if it is advantageous, particularly for space reasons or for mobility reasons.

Overall, a modular robot platform for inspection and servicing of technical facilities according to the invention is distinguished in that
  it has at least one drive unit with integrated control electronics
  it has a device to determine the position of the robot platform,
  the individual modules have standardized digital interfaces for intermodular data interchange, and
  the position data from the unit is transmitted to the exterior via digital interface for further use outside the control loop of the motor drive, and is made available for further purposes.

| LIST OF REFERENCE SYMBOLS | |
|---|---|
| 10, 20 | Robot platform (modular) |
| 11 | Connector |
| 12-14 | Communication link (Ethernet) |
| 15 | Drive module |
| 16 | Magnet wheel |
| 17 | Linear movement module |
| 18 | Frame |
| 19 | Linear guide |
| 21 | Carriage |
| 22 | Electronics box |
| 23 | Connecting element |
| 24 | Connecting socket |
| 25 | Steering roller |
| 26 | Power submodule |
| 27 | Electric motor (direct-current motor) |
| 27a | Gearbox |
| 28 | Microcontroller submodule |
| 29 | Mounting hole |
| 30, 31 | Component (electronic) |
| 32 | Microcontroller |
| 33 | Position transmitter submodule |
| 34 | Chassis |
| 35 | Position transmitter wheel |
| 36 | Mounting element |
| 37 | Encoder unit |
| 38, 39 | Wheel |
| 40 | Rotating bearing |
| BS | Base station |
| IF | Interface (for example Ethernet) |
| M1-M5 | Module |
| SM1-SM14 | submodule |

What is claimed is:

1. A robot platform configured to remotely controlled at least one of autonomous inspection of technical facilities, comprising at least a drive mechanism configured to move the robot platform; an inspection device configured to inspect the technical facility; a position determination device configured to determine position data of the robot platform, and a communication device configured to exchange measurement for at least one of control data and transmission of measurement and position data to an evaluation unit, the robot platform is modular, the communication device operates in accordance with a uniform standard, and the measurement and position data is streamed to the evaluation unit with a time delay of less than 1 ms.

2. The robot platform as claimed in claim 1, wherein the robot platform is comprised of individual modules which are physically connected to one another by mechanical connectors for at least one of for exchanging data by digital communication links, which operate in accordance with a uniform standard.

3. The robot platform as claimed in claim 2, wherein the digital communication links operate in accordance with an Ethernet standard.

4. The robot platform as claimed in claim 2, wherein the digital communication links additionally have power supplies that supply power to the modules.

5. The robot platform as claimed in claim 2, wherein the individual modules each have one or more submodules.

6. The robot platform as claimed in claim 5, wherein one of the submodules is an interface for data exchange and a power supply link between the modules.

7. The robot platform as claimed in claim 5, wherein the individual modules have an electric drive motor and an integrated control unit for the electric drive motor, the control unit having a power submodule and a microcontroller submodule as submodules.

8. The robot platform as claimed in claim 2, wherein at least one of the modules is a drive module for movement of the robot platform.

9. The robot platform as claimed in claim 8, wherein the drive module has an electric drive motor, and, as submodules, comprises: at least one magnetic wheel for rolling on and sticking to a surface, of the technical facility to be inspected, a power submodule for supplying power to the drive motor, and a microcontroller submodule for controlling the electric drive motor.

10. The robot platform as claimed in claim 2, wherein one of the modules is a linear movement module for linear movement of an inspection device arranged thereon.

11. The robot platform as claimed in claim 2, wherein one of the modules is a base station, which is configured to control the data exchange of inspection signals with the other modules and evaluation units.

12. The robot platform as claimed in claim 11, wherein the base station emulates encoder signals, in order to allow simple connection of evaluation units to the robot platform.

13. The robot platform as claimed in claim 11, further comprising a device, configured to coordinate transformation of position data, provided upstream of the evaluation unit, such that the evaluation unit can operate in a freely selectable coordinate system which is matched to the inspection to be carried out.

14. The robot platform as claimed in claim 2, wherein at least one of the modules is configured to determine a position of the robot platform.

15. The robot platform as claimed in claim 14, wherein a position transmitter submodule is provided to determine the position, and has a position transmitter wheel and an encoder unit.

* * * * *

UNITED STATES PATENT AND TRADEMARK OFFICE
CERTIFICATE OF CORRECTION

PATENT NO.        : 8,369,990 B2
APPLICATION NO.   : 13/228358
DATED             : February 5, 2013
INVENTOR(S)       : Wolfgang Zesch and Markus Wiesendanger It is certified that error appears in the above-identified patent and that said Letters Patent is hereby corrected as shown below:

In the Claims:

Column 6, Lines 46-47, in claim 1, line 1, change "platform configured to remotely controlled at least one of autonomous" to -- platform configured to at least one of remotely controlled or autonomous --

Column 6, Lines 60-62, in Claim 2, line 4, change "modules which are physically connected to one another by mechanical connectors for at least one of for exchanging data" to -- modules which are at least one of physically connected to one another by mechanical connectors or for exchanging data --

Signed and Sealed this
Second Day of July, 2013

Teresa Stanek Rea
*Acting Director of the United States Patent and Trademark Office*